Patented Oct. 8, 1929

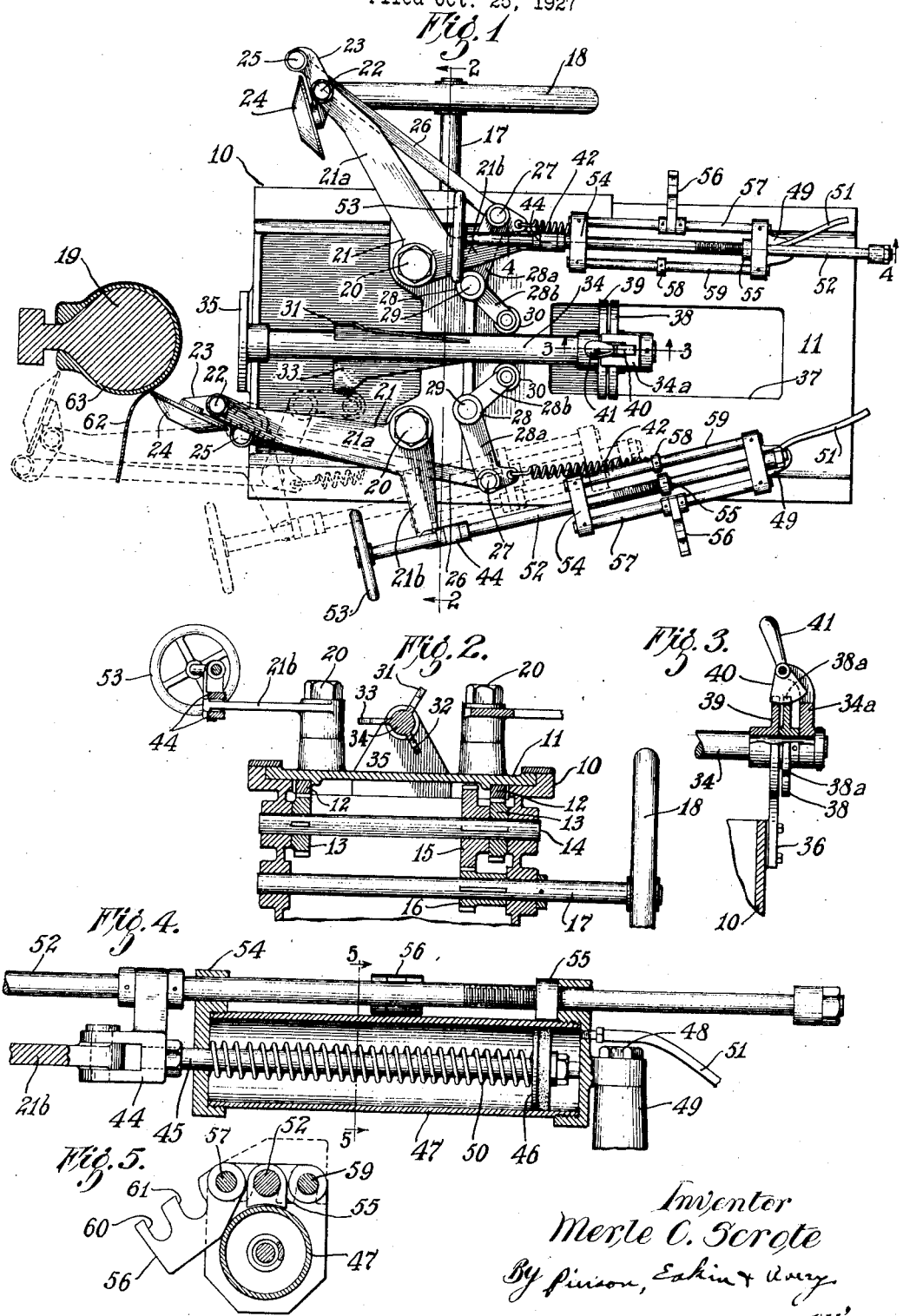

1,731,026

UNITED STATES PATENT OFFICE

MERLE C. SCROTE, OF KENMORE, OHIO, ASSIGNOR TO THE B. F. GOODRICH COMPANY, OF NEW YORK, N. Y., A CORPORATION OF NEW YORK

TIRE-MAKING MACHINE

Application filed October 25, 1927. Serial No. 228,605.

This invention relates to procedure and apparatus for making tires and its chief objects are to provide for improved "stitching down" of tire fabric upon a tire-building core; to provide improved means for changing the angularity of the stitching tool with relation to the core as the stitching operation progresses from the tread portion toward the bead portion of the tire and for otherwise controlling the movement of the stitcher; to provide improved means adapted for stitching down one side only of the tire-band and then stitching down the other, so that the operator's full attention may be directed to a single stitching tool, which is of especial importance in making tires of large size such as to call for a large amount of longitudinal contraction of the fabric adjacent the bead, and so that, the core being driven in one direction for stitching down the fabric on one side and in the other direction for stitching down the fabric on the other side, the stitching tool may operate in like relation to the bias cords on the two sides of the core; and to provide a simple mechanism for work of this kind.

Of the accompanying drawings:

Fig. 1 is a plan view of a tire-building machine embodying and adapted to carry out my invention in its preferred form.

Fig. 2 is a section on line 2—2 of Fig. 1.
Fig. 3 is a section on line 3—3 of Fig. 1.
Fig. 4 is a section on line 4—4 of Fig. 1.
Fig. 5 is a section on line 5—5 of Fig. 4.

Referring to the drawings, the machine comprises a frame 10 formed on its upper face with a guide-way for a slide 11 constituting a tool-carriage and having secured to its lower face a pair of racks 12, 12 (Fig. 2) meshed with respective pinions 13, 13 secured upon a shaft 14 journaled in the frame and having secured thereon a gear 15 meshed with a pinion 16 which is secured upon a shaft 17 provided with a hand wheel 18 for running the carriage toward and from a tire building core 19 mounted upon the usual core rotating chuck (not shown).

Fulcrumed upon the carriage at 20, 20 are a pair of bell crank levers 21, 21 having pivoted on their forward arms 21ª, 21ª at 22, 22 respective tool-carrying levers 23, 23, each having a stitcher tool 24 journaled on its inner end and having its outer end pivoted at 25 to a link 26 having its other end pivoted at 27 to the outer arm 28ª of a bell-crank lever 28 fulcrumed at 29 on the carriage. The inner arm 28ᵇ of each bell-crank lever 28 has journaled thereon a cam roller 30 adapted to coact with one or another of a set of cams 31, 32, 33 mounted in longitudinal position upon a stationary shaft 34 and equally spaced apart circumferentially of the shaft, the construction being such that forward movement of the carriage 11 with one of the rollers 30 running upon one of the cams will cause the respective stitcher tool 24, together with the lever 23 upon which it is mounted, to be swung about the pivot 22 and thus to change its angular relation to the surface of the core 19 as the stitching operation is carried from the tread portion toward the bead portion of the tire, as will be understood upon comparison of the full line position and the dotted line position of the operative stitcher tool in Fig. 1.

The shaft 34, having the cams thereon, is mounted in stationary brackets 35, 36 rising from the frame 10, the brackets 36 rising through an opening 37 in the tool carriage, and the shaft has secured thereon adjacent the bracket 36 a disk 38 formed with radial notches 38ª, 38ª, positioned 120° apart, the disk 38 being adapted to be rotated, with the shaft 34, to bring one or another of the said notches in registry with a similar notch formed in a disk 39 constituting a part of the bracket 36, so that one or another of the cams 31, 32, 33 may be brought into position to coact with either one of the rollers 30, and a latching plate 40 provided with a handle 41 is pivoted upon an arm 34ª swiveled on the shaft 34 and adapted to enter the notches in the disks 38 and 39 to latch the shaft 34 in the desired angular position.

To hold the roller 30 in engagement with the cam, the outer arm 28ª of each of the bell-crank levers 28 is connected by a pull spring 42 with a part of the carriage 11.

For holding the stitcher tool with suitable pressure against the work as it moves from the tread portion to the bead portion of the tire and for changing its angularity as described, the outer or rear arm 21$^b$ of each of the bell-crank levers 21 (see Figs. 2 and 4) is pivoted to a bracket 44 secured upon the end of a piston rod 45 having its piston 46 in a cylinder 47 of which the rear end is pivoted at 48 upon a standard 49 rising from the carriage 11. A compression spring 50 is interposed between the piston 46 and the forward cylinder-head for returning the piston to the rear end of the cylinder when the latter is exhausted, a flexible pipe 51 being provided for charging and exhausting the rear end of the cylinder.

Means is provided for limiting the stroke of the piston so that when the stitcher tool has reached the dotted line position of Fig. 1 it will not be immediately forced by the cylinder and piston device to progress inward over the cylindrical inner face of the bead of the tire toward the central plane of the core, and provision is made for then feeding the tool inward by hand over that surface of the bead, so that its progress may be suitably gradual to avoid undesirable wrinkling and buckling of the tire fabric on the inner face of the bead.

The devices for so controlling the action of the stitcher comprise a shaft 52 journaled and secured against longitudinal movement in the bracket 44, provided at its forward end with a hand wheel 53, and extending slidably and rotatably through a bearing 54 formed on the forward cylinder-head, the rear end of the shaft being threaded through a stop-nut 55 so formed with a concave arcuate side as to fit slidably and non-rotatably against the surface of the cylinder 47 (see Fig. 5), so that the position of the nut 55 upon the shaft 52 may be varied by simply turning the hand wheel 53.

To limit the stroke of the piston a latch 56 is hinged upon a bar 57 connecting the cylinder-heads at one side of the shaft 52 and is adapted to be swung over so that its other end will rest against a collar 58 secured upon a bar 59 connecting the cylinder-heads at the other side of the shaft 52, the latch being formed with a notch 60 adapted to be occupied by the bar 59 and with a notch 61 adapted to admit the screw shaft 52, so that when the latch is in latching position it will be abutted by the stop nut 55 in forward movement of the piston and will thus act as a stop for the piston structure against further forward movement thereof and further inward movement of the stitcher tool toward the central plane of the core. The construction is such, however, that such further inward movement of the stitcher tool, under the force of the piston, may be permitted by turning the hand wheel 53 and thus permitting the piston to creep farther forward, while the latch 56 continues to act as a stop for the nut 55.

The nut 55 upon the operative side of machine, when the machine is in the position of operation shown in Fig. 1, is at a position too far forward to permit the latch 56 to be turned into latching position in front of the nut, but the construction is such that, as the carriage moves farther toward the tire core and the pivot 22 of the stitcher tool is forced outward by the swinging movement of the stitcher tool's lever 23 enforced by the cam 33 and cam roller 30, the stop nut 55 will be driven backward against the force of the piston to a position such as to admit the latch 56, the parts then being approximately in their dotted line positions of Fig. 1.

In the operation of the machine, a band of tire fabric 62 being mounted upon the partly built tire 63, including the under bead plies and the beads, the tire-core 19 being rotated, and the cam shaft 34 being set in such a position that the cam 33 will coact with the adjacent roller 30 while the other cam roller 30 runs in the space between the cams 31 and 32, the carriage 11 is fed forward toward the tire core by means of the hand wheel 18, compressed air being supplied to the rear end of the cylinder 47 on the operating side of the machine so as to hold the operating stitcher tool 24 against the work.

As the carriage moves forward the stitching operation is carried from the tread portion toward the bead portion of the tire and at the same time the angularity of the stitcher tool is appropriately changed by coaction of the cam 33 with the roller 30. Shortly before the stitcher tool has reached the dotted line position of Fig. 1 the latch 56 is thrown over, to be engaged by the stop nut 55 when the carriage is fed so far forward as to carry the stitcher tool past the heel of the bead. The movement of the carriage is retarded when the stitcher tool has reached approximately the dotted line position of Fig. 1, just prior to which time a sudden rise in the cam 33 changes the angularity of the stitcher tool to that shown in the dotted line position, so that it can act effectively upon the inner cylindrical face of the bead. The stitcher tool is then permitted to progress slowly inward over that face of the bead, under the force of the fluid pressure cylinder, by turning the hand wheel 53 and thus gradually releasing the piston for the necessary further movement, while the position of the carriage is so controlled by means of the hand wheel 18 as to provide the desired radial pressure of the tool against the bead.

As soon as the stitching operation is completed the cylinder is exhausted, the spring 50 returning the piston to the rear end of the cylinder and thus throwing the stitcher tool outward away from the work, the carriage is run back to its starting position by means of the hand wheel 18, the stitcher tool 24 being swung about its pivot 22 to its original position by the spring 42 as the cam roller 30 runs backward upon the cam 33, and the operation as described is repeated with respect to another band of tire fabric, or with respect to the other side of the same band, the cam shaft 34 being indexed to present the desired one of cams 31, 32, 33 in position to act with the cam roller 30 upon whichever side of the machine is to be used. The stitcher mechanism may be operated as described with the core rotating in either direction, so that the stitchers may operate in the same relation to the cords on both sides of the core.

The machine as described affords the several advantages set out in the above statement of objects and provides more detailed advantages which will be obvious to those skilled in the art.

Modifications are possible within the scope of my invention as defined in the appended claims.

I claim:

1. A tire-making machine comprising a rotatably mounted tire-building core, a tool carriage mounted for movement toward and from the same, a pair of tire tools mounted upon the said carriage and adapted to operate upon the respective sides of the core, means for alternatively holding one of the said tools in engagement with the work and the other out of engagement with the work while the carriage is moved toward the core, and means for changing the angular relation of the tool to its holding means as the carriage moves toward the core.

2. A tire-making machine as defined in claim 1 including stationary cam means mounted for actuation of the tools singly and selectively by movement of the carriage with relation to the cam means to change the angular relation of the tool to the core as the tool passes from the tread portion toward the bead portion of the core.

3. A tire-building machine comprising a rotatably mounted tire-building core, a tool carriage mounted for movement toward and from the same, a tire tool mounted upon the carriage and adapted to operate upon the core from the tread portion thereof toward the bead portion thereof, means for yieldingly holding the tool against the work, and means for so limiting the action of the said yielding means as to stop the movement of the tool toward the middle plane of the core at a position adjacent the heel of the tire bead.

4. A tire-making machine as defined in claim 3 including hand-controlled means for feeding the tool from a position adjacent the heel to a position closer the toe of the bead.

5. In a tire-making machine the combination of a shaft having longitudinally disposed cam members thereon, means for securing the said shaft in different rotary positions to hold one or another of the cam members in operative position, a tire tool mounting movable along the shaft, a tire tool on said mounting, and means on said mounting adapted to coact with the positioned cam member for controlling the movement of the tire tool.

6. A tire-making machine comprising a rotatably mounted tire-building core, a tool carriage mounted for movement toward and from the same, a tool-carrying member mounted on said carriage, a tire tool mounted on said member, a fluid pressure cylinder having connection to said member for urging the tire tool toward the middle plane of the core, and means for adjustably controlling the stroke of the cylinder.

7. A tire-making machine comprising a rotatably mounted tire core, a tire tool, means for feeding the tire tool from the tread portion toward the bead portion of the core, means for yieldingly urging the tire tool laterally toward the core, means for limiting the action of the said yielding means, and hand-operated means for controlling inward movement of the tool beyond the position in which it is stopped by the said limiting means.

8. In a tire-building machine the combination of a tire tool, a fluid-pressure device for actuating the same, a stop for limiting the stroke of the said device, and a hand-screw for changing the relative positioning of the stop and thereby releasing the device for continuation of the stroke beyond the limit initially imposed by the stop.

In witness whereof I have hereunto set my hand this 20th day of October, 1927.

MERLE C. SCROTE.